United States Patent Office

3,826,677
Patented July 30, 1974

3,826,677
POLY-1-BUTENE COATED RELEASE PAPER
Alfred Michels and Kurt Fleischer, Marl, Germany, assignors to Chemische Werke Huls Aktiengesellschaft, Marl, Germany
No Drawing. Filed Feb. 25, 1972, Ser. No. 229,510
Claims priority, application Germany, Mar. 12, 1971,
P 21 11 884.3
Int. Cl. C08f 3/12; D21h 1/10
U.S. Cl. 117—76 P       8 Claims

ABSTRACT OF THE DISCLOSURE

A release coating, particularly for paper products, applied from a hot melt of predominantly isotactic poly-1-butene or copolymers of poly-1-butene having an average molecular weight of 700,000 to 2,000,000 and a melting range of about 120 to 130° C.

CROSS-REFERENCES TO RELATED APPLICATIONS

The state of the art of polymerizing poly-1-butene may be ascertained by reference to application Ser. No. 13,721, filed Feb. 24, 1970 and the continuation-in-part thereof Ser. No. 203,060, filed Nov. 29, 1971, now U.S. Pat. 3,749,555.

BACKGROUND OF THE INVENTION

The field of the invention is coating products having synthetic resin coating on a paper base. The invention is particularly concerned with a release paper.

It is known that films of a thermoplastic material, particularly soft films can be produced by extruding the warm plastic polymer out through fishtail dies, calendering, or by applying the polymer by means of laminating machines to a substrate which, in most cases, is a textile material.

It is also conventional to produce these films advantageously by spreading the polymer, for example in the form of a paste, onto an auxiliary substrate, or strewing it thereon in the form of a powder, gelling the polymer in the warm state, and then removing the finished film from the auxiliary substrate. This has the advantage, inter alia, that the film exhibits a highly glossy side when the auxiliary substrate was also highly lustrous. Likewise, it is possible to impart to the film, by way of an embossed surface of the auxiliary substrate, an embossed, for example leather-like, appearance. Furthermore, it is possible, for example, to first apply a soft polyvinyl chloride to the auxiliary substrate. Thereafter, or after a gelling step, a blowable coating is applied to the polyvinyl chloride layer which yields a foam layer upon gelling, and finally a textile layer is applied. In the case where the first layer does not yet exhibit the desired grain, an embossment, or matting of the entire composite is conducted through a slightly narrowed embossing roll after a brief surface heating by infrared irradiation. Thus, here the mode of operation is the reverse of the earlier procedure wherein a textile web was provided and then the coatings were applied successively, from the bottom toward the top, and thereafter the embossing step was conducted.

This newer technique has the prerequisite that a suitable auxiliary substrate is employed.

Release papers are employed as auxiliary substrates which provide a coating in order to make it possible to peel off the film easily. The coating consists generally of silicone resin. Since this material is expensive, it is necessary to use the release paper several times. In practice, the papers are used up to ten times. In order to make this possible, it is, of course, also necessary to select a durable paper, whereby the costs are additionally increased.

In spite of this, the multiple use of the release paper presents difficulties. The windup devices must be constructed very accurately, adjusted in an extremely exact manner, and constantly monitored, to avoid the danger that the release paper is damaged, wrinkled or creased. When damaged, the entire roll is immediately useless. The same holds true if a residue of the thermoplastic material adheres to the paper in an undesirable manner.

SUMMARY OF THE INVENTION

Having in mind the limitations of the prior art, it is an object of the present invention to provide a simple release paper which is so inexpensive that it can be used for one-time use only. This has the advantage that the effort and risk of a repeated film separation as well as a repeated windup and unwinding are saved. The release paper remains in the film roll as an intermediate layer, and it thus protects the film and makes the latter more readily processable.

However, it is known from the "Kunststoffhandbuch," Carl Hanser publishers, Munich, Vol. IV (Polyolefins), pp. 411 and 639, that all hot melt films exhibit an inherent curling tendency, due to the contraction of the polyolefins melt layer beginning during the cooling step, and of course, this makes them useless as a release paper.

Surprisingly it has been found that this curling problem is solved by a release paper containing a hot melt coating of poly-1-butene or copolymers of 1-butene.

The poly-1-butene is a predominantly isotactic material having an average molecular weight of 700,000 to 2,000,000, which preferably does not contain more than 10 percent by weight, especially no more than 5 percent by weight, of atactic components. The poly-1-butene is polymerized in accordance with the methods of Ziegler-Natta. The melting range is from about 120 to 130° C. The temperature of the hot melt is about 160 to 230° C., preferably 170 to 225° C., especially 180 to 210° C., these temperatures depending upon the number of rolls used in the arrangement and from the operating speed; the higher the speed, the higher the temperature. The bulk density according to German Industrial Standard DIN 53,479 is 0.9–0.93, preferably 0.91–0.92. The melt index according to DIN 53,735 is 0.2–40, preferably 0.3–20. The viscosity $\eta_{red}$ value is 1.5–60, preferably 2–5 dl./g.

By predominantly isotactic is meant insoluble in refluxing heptane. At least 90 weight percent of the polymer will be insoluble in refluxing heptane and preferably more than 95 weight percent of the polymer will be insoluble in refluxing heptane. In determining the solubility, 10 parts of heptane are used per part of polymer.

Furthermore, copolymers of 1-butene with ethylene, propylene, and higher α-olefins are employed, insofar as these copolymers are predominantly crystalline and exhibit a melting range which does not begin below 120° C. The olefin has 2 to 18 carbon atoms, preferably 2 to 6, especially 2 to 4 carbon atoms.

Suitable copolymers are obtained, preferably in accordance with the polymerization process of Ziegler-Natta, by the copolymerization of 1-butene and other olefins, in a molar ratio of above 60:40, preferably above 85:15, and in particular above 90:10, based on the copolymer.

Specific examples of the preferred copolymers of the present invention and their molar ratios include copolymers of: 95 1-butene:5 propylene; 99.7 1-butene:3 ethylene; 99.0 1-butene:1.0 ethylene; 95 1-butene:5 dodecene; 96 1-butene:4 octadecene. Of course, it is possible to use minor amounts of these olefin comonomers.

DESCRIPTION OF THE PREFERRED EMBODIMENTS

In order to increase the adhesion of the applied plastic film, it is possible to fill the polybutenes with 1 to 85 percent, preferably 50 to 60 percent by weight of fillers, such as, for example, finely divided calcium carbonate or Paris white, barium sulfate, or other minerals, such as kaolin, talc, etc. Preferably, Paris white is employed as the filler.

As the paper base for the release paper, any type of paper can be used. However, in view of the fact that a disposable release paper is involved, papers should be used which are as lightweight and cheap as possible, for example creped paper of 20 g./m.$^2$, newsprint of 50 g./m.$^2$, or soda paper of 60 g./m.$^2$. A somewhat roughened paper surface is of advantage for the adhesion of the poly-1-butene. However, due to the minor coat thicknesses, no structural markings must be noticeable, unless this is expressly desired.

The paper is coated with approximately 10–200 g./m.$^2$ of poly-1-butene without fillers, preferably 20–30 g./m.$^2$. If fillers are employed, only about half the weight of poly-1-butene is required, i.e. in the preferred range 10–15 g./m.$^2$.

The film applied to the base material has a thickness of about 0.001 to 0.050 inch and preferably about 0.005 to 0.025 inch.

The coating of the paper with the poly-1-butene is conducted in a conventional manner, for example in accordance with the hot melt coating process or by means of an extruder. Calenders are also suitable, consisting of several rolls, some of them applied for melting the polymer, others for heating the paper, others for coating the paper, others for cooling the coated paper, in a known manner.

The novel release paper can be employed for the gelling of various polymers. For example, its use proved advantageous for mixtures of soft polyvinyl chloride wherein the proportion of the polymer to the plasticizer ranges within a wide ratio, preferably being between 50:50 and 90:10. The release paper is likewise usable for copolymers, e.g. those of vinyl chloride and vinyl acetate, for example in a weight ratio of 50:50 to 98:2, especially about 95:5. Furthermore, graft polymers on the basis of polyvinyl chloride with an elastomeric component of ethylene-vinyl acetate can be employed. Further, a copolymer on the basis of vinyl chloride-styrene 70:30 can be used. Also, the paper can be employed with excellent success for polyurethanes applied from a solution or in the form of a solid. Likewise, polyglutamates applied from a solution can be separated easily from the poly-1-butene coated paper after drying.

Basically, it is of no importance whether the material, which is later a film, is applied to the poly-1-butene coated paper as a solution, as an aqueous dispersion, as a powder mixture, as melt granules, or as a plastisol. In any event, the film is readily pulled off from the novel release paper even after a long storage time.

Due to the physiological harmlessness of poly-1-butene, such release papers can also be used in the preservation of food.

Such a poly-1-butene is distinguished especially by thermal stability, so that the coating does not suffer the smallest alteration in structure or the lowest amount of stress, either during the application of the coating material, or during the gelling step. Therefore, the film produced on the release paper likewise remains free of undesired effects.

The novel release paper is producible without any complications and can be used in an easy and safe manner. The thermal stability of the release paper increases with a decreasing $I_5$-value of the poly-1-butene wherein $I_5$ is defined as the melt index according to ISO R 292, method C (MFI 1), of the International Organization for Standardization.

As the paper, the most lightweight fleece can be used, or also cardboard which can be wound up. A smooth paper permits a thinner coat of poly-1-butene, but the adhesion of both substances must be ensured. Since the release effect is exceedingly satisfactory, it can be advantageous to employ fillers which, moreover, increase the economy.

Example 1

Creped paper of 20 g./m.$^2$ was coated, at a coating thickness of 60 g./m.$^2$, with poly-1-butene, molecular weight 1,800,000, melting range 120–130° C., heptane-soluble components 0.7 percent by weight, by means of a hot melt roll arrangement as described in P. Schmidt, "Beschichten mit Kunststoffen," Kunststoff-Verarbeitung Series 1, Carl Hanser publishers, Munich 1967, pages 117–124, especially Figures 43 and 44, at a roll temperature of 180–190° C. and a roll pressure of 60–65 kg./cm.$^2$. No filler was employed in this process.

In a spreading unit, a paste consisting of 50 parts by weight of polyvinyl chloride (suspension type, K-value 70), 18 parts of polyvinyl chloride (emulsion type, K-value 80), 20 parts of diisodecyl phthalate, 9 parts of benzyl butyl phthalate, 3 parts of epoxidized stearate, and 1.4 parts of a barium-cadmium stabilizer is applied to the thus-obtained release paper, present in a roll of a width of 150 cm. and in a coating thickness of 100–300μ. The coating is then gelled in a jet-type gelling channel having a length of 8 m. at 200° C. and at an operating speed of 2 m./min.

After cooling, the film of soft polyvinyl chloride readily adheres to the release paper and can be pulled off without any effort and in a completely uniform manner. This also holds true after a long storage time and is applicable to all layer thicknesses, as well as to similar compositions, for example for chemically as well as mechanically blown polyvinyl chloride.

Example 2

Newsprint paper of 50 g./m.$^2$ was coated with a coat of 20 g./m.$^2$ of poly-1-butene, molecular weight 2,000,000, melting range 125–132° C., ether-soluble components 1.0 percent by weight, containing 50 percent of Paris white, by means of a melt coating plant at a roll temperature of 180–200° C. and a roll pressure of 70–80 kg./cm.$^2$.

In a spreading plant, a solution of linear polyurethane in dimethylformamide and ethyl acetate is applied to the thus-produced release paper in a width of 200 cm., and the composite is dried in a drying channel at 60–120° C. during a residence time of 60–90 seconds, the film being present in a thickness of 50–100μ. After cooling, the film is readily pulled off. This is also true when a layer of fabric is applied, optionally after depositing a second layer of solution. In place of the linear polyurethane, it is also possible to employ a cross-linkable or foamable polyurethane. The release effect remains excellent.

If, in place of the polyurethane, a polymethyl glutamate, dissolved in ethylene chloride, is utilized, then the same effect is obtained at a residence time of 30–60 seconds.

Example 3

Soda kraft paper of 70 g./m.$^2$ was coated with a coat of 50 g./m.$^2$ of a copolymer consisting of 95 percent of 1-butene and 5 percent of propylene, molecular weight 750,000, containing 85 percent of barium sulfate having a particle size of 5–50μ, by means of an extruder at a temperature of 170–200° C.

On this release paper is extruded, in a width of 100–150 cm. (die temperature 160° C.), in a thickness of 100–500μ, a copolymer of 95 percent of vinyl chloride and 5 percent of vinyl acetate, plasticized with 25 percent of dioctyl phthalate, based on 100 percent of this copolymer, wherein as usual a laminating procedure is conducted by way of rolls. Here again, the film obtained is separated from the substrate readily and uniformly.

In place of the extruder, it is also possible to employ a melt roll plant for applying the copolymer.

We claim:
1. A release paper comprising a paper base material and a release coating thereon of from 0.001 to 0.05 inch thickness of a predominantly isotactic poly-1-butene or copolymer of 1-butene with an olefin comonomer having 2 to 18 carbon atoms wherein the molar ratio of 1-butene to comonomer is above about 60:40 and the molecular weight of said poly-1-butene or copolymer is at least 700,000.
2. The release paper of Claim 1, having a coating of polyvinyl chloride on said release coating.
3. The release paper of Claim 1, wherein said poly-1-butene or copolymer contains about 1 to 85 percent by weight of filler.
4. The release paper of Claim 1, wherein said poly-1-butene or copolymer has a molecular weight of about 700,000 to 2,000,000.
5. The release paper of Claim 4, wherein said poly-1-butene or copolymer contains no more than about 10 percent atactic components.
6. The release paper of Claim 5, wherein said poly-1-butene or copolymer has a bulk density of about 0.9–0.93.
7. The release paper of Claim 6, wherein said poly-1-butene or copolymer has a melt index of about 0.2–40.
8. The release paper of Claim 7, wherein said poly-1-butene or copolymer is applied from a hot melt wherein the temperature is about 160 to 230° C.

References Cited
UNITED STATES PATENTS

| | | | |
|---|---|---|---|
| 3,503,782 | 3/1970 | Ayres | 117—76 P X |
| 3,580,898 | 5/1971 | Rosen et al. | 260—93.7 |
| 3,667,994 | 6/1972 | Ward | 117—76 P |
| 3,385,817 | 5/1968 | Jones | 260—93.7 X |
| 3,067,054 | 12/1962 | Reese | 117—76 P X |
| 3,674,757 | 7/1972 | Uffner | 260—93.7 X |
| 3,644,320 | 2/1972 | Sugiura et al. | 260—93.7 |

RALPH HUSACK, Primary Examiner

U.S. Cl. X.R.

117—155 UA; 260—93.7, 896; 264—213